United States Patent [19]

Chuang et al.

[11] Patent Number: 5,666,447
[45] Date of Patent: Sep. 9, 1997

[54] USING OPTICAL FIBER MULTIPLEXER TO COMBINE LIGHT BEAMS IN A LASER PRINTER

[75] Inventors: Chih-Li Chuang; Sanwal Prasad Sarraf, both of Pittsford, N.Y.

[73] Assignee: Eastman Kodak Company, Rochester, N.Y.

[21] Appl. No.: 342,958

[22] Filed: Nov. 21, 1994

[51] Int. Cl.[6] .................................................. G02B 6/26
[52] U.S. Cl. .................................. 385/31; 385/89; 385/24; 385/46
[58] Field of Search ................................. 385/16, 17, 20, 385/21, 24, 31, 39, 46; 347/232, 115, 241, 243, 244, 256, 258, 259, 239

[56] References Cited

U.S. PATENT DOCUMENTS

| Re. 33,296 | 8/1990 | Stowe et al. | 350/320 |
|---|---|---|---|
| 4,232,385 | 11/1980 | Hara et al. | 370/3 |
| 4,342,504 | 8/1982 | Ebner | 354/7 |
| 4,373,782 | 2/1983 | Thelen | 350/166 |
| 4,632,513 | 12/1986 | Stowe et al. | 350/320 |
| 4,772,085 | 9/1988 | Moore et al. | 350/96.15 |
| 4,798,438 | 1/1989 | Moore et al. | 350/96.15 |
| 4,834,481 | 5/1989 | Lawson et al. | 350/96.15 |
| 4,884,095 | 11/1989 | Yamanouchi et al. | 355/1 |
| 4,900,118 | 2/1990 | Yanagawa et al. | 350/96.15 |
| 4,932,747 | 6/1990 | Russell et al. | 350/96.24 |
| 4,933,688 | 6/1990 | Brophy | 346/108 |
| 5,113,244 | 5/1992 | Curran | 385/24 |
| 5,170,451 | 12/1992 | Ohshima | 385/43 |
| 5,502,783 | 3/1996 | Wu | 385/42 |
| 5,504,609 | 4/1996 | Alexander et al. | 359/125 |

FOREIGN PATENT DOCUMENTS

| 58-27121 | 2/1983 | Japan | 385/46 |
|---|---|---|---|
| 3-195221 | 8/1991 | Japan | 385/46 |
| 2214747 | 9/1989 | United Kingdom | 385/46 |

*Primary Examiner*—John Ngo
*Attorney, Agent, or Firm*—Nelson A. Blish

[57] ABSTRACT

A color laser printing apparatus that incorporates the use of fiber optics and a flexible beam-combining device to combine two or more lasers having different wavelengths that correspond to the photosensitivities of the image-receiving media. Use of fiber optics on a flexible beam-combining device allows high flexibility in the placement of components associated with a color laser printing apparatus and making the system easier to align. Because the components of the system no longer require placement in close proximity to one another, certain aspects of the system can be made more compact and any adverse effects of heat generation of the components, such as the lasers, can be greatly reduced.

19 Claims, 3 Drawing Sheets

USING OPTICAL FIBER MULTIPLEXER TO COMBINE LIGHT BEAMS IN A LASER PRINTER

CROSS REFERENCE TO RELATED APPLICATIONS

Reference is made to commonly assigned U.S. patent application Ser. No. 08/342,568 entitled "A PRINTHEAD FOR A LASER PRINTER USING OPTICAL FIBERS" and filed on even date herewith.

1. Field of the Invention

The present invention relates to a beam-combining device which is used for color laser printing, where light sources of different wavelengths corresponding to the media photosensitivities are combined for subsequent scanning and imaging onto the media plane.

2. Background of the Invention

Conventional methods of beam combination employ either dichroic mirrors (as in U.S. Pat Nos. 4,933,688 and 4,982,206) or dichroic prisms. These methods generally require tedious alignment procedures to ensure the co-linearity of each of the beams being combined. In addition, because of the unbreakable sequence of the propagation of laser beams, if any of the input light source needs to be changed, for example, because of failure of light sources, the whole optical chain including the part after the beam combination needs to be realigned.

Another method of beam combining is disclosed in U.S. Pat. No. 4,911,526 where laser beams are brought together through closely spaced optical fiber. One problem with this method is that light beams from these fibers, carrying light from, different laser sources, cannot be brought to overlap on top of one another to form a single spot without sacrificing beam co-linearity because of the finite physical size of each individual fiber. This means that we will not have one beam, but rather three beams separate from one another. To image these three non-overlapping beams will require optics of larger field of view as compared to the case of a single overlapping beam spot to be described in this invention. The larger field-of-view requirement generally is more difficult and costly to implement because more complicated optical systems will be needed to correct for the larger aberration at a larger field so that all three beams can be imaged properly.

A third method of beam combination is disclosed in U.S. Pat. No. 4,884,095, where three optical fibers from three different light sources are brought together to mix in a larger optical light guide. The problem with this configuration is that in an optical system incorporating scanning mechanism such as polygons, the etendue (also called throughput or geometric extent), defined as the produce of cross-sectional area of a light beam and the solid angle included by the beam, that can be handled by the scanning mechanism is usually smaller than that from the light guide. Since etendue is a geometric measure of the maximum power that can be transferred by an optical system which is fully illuminated at the entrance pupil, this mismatch in etendue means that the light beam coming out of the light guide cannot be fully collected by the subsequent scanning optics. Efficient use of laser power will thus be sacrificed and a higher power and a more costly laser will then be required.

Yet another way of beam combination is found in the field of optical fiber communication to increase transmission capacity, where optical fibers are fused together to form a fiber multiplexer. These methods include frequency division multiplexing as disclosed in U.S. Pat. Nos. 4,232,385 and 5,113,244 and wavelength division multiplexing as disclosed in U.S. Pat. No. 5,170,451. However, those used for frequency division multiplexing generally combine the beams through the use of two different fibers in the same device, with the incoming fiber having a smaller core diameter, and the outgoing fiber having a larger core diameter. This is because the objective in their application is to combine as much light as possible from light sources modulated at different frequency ranges and the use of fibers of larger core diameter will achieve that. However, the combined beams will have larger etendue (as defined previously) than the subsequent scanning and imaging optics can handle if used in a printing apparatus. Inefficient use of power will result in higher light source cost. Those used for wavelength division multiplexing are designed and manufactured with the objectives of a large signal to noise ratio with little crosstalk. The problems with using this type of device for color laser printing are: Firstly, the wavelength ranges used in optical communication are in the 850, 1300 and 1550 nm ranges. These wavelength ranges deviate far away from the wavelength range typically encountered in color laser printing, for example, 457, 543 and 670 nm. This means that the wavelength division multiplexers used in optical communication, when used to do color laser printing, will have the problem of low transmission due to wavelength mismatch, thus requiring higher power laser sources. Secondly, the ratio of transmission for light beams of different wavelength does not reflect the requirements imposed by the photosensitivities of the media being used. Generally, photosensitive media will have different sensitivities for light beams of different wavelengths. To accommodate for the lower photosensitivity of a certain wavelength range, larger transmission out of the beam combiner for this wavelength will be required, especially when the maximum power levels of the light sources available is limited or when higher power lasers cost beyond budget level.

In summary, to adapt the three beams for the scanning optics in the printing process, a flexible and inexpensive method of beam combination is needed. However, conventional methods are either difficult to align or not able to provide enough throughput with the scanning optics. Fiber multiplexers used in the optical communication are either not able to provide efficient use of optical power provided by the light sources or not matched to the media photosensitivities. Employment of the types of laser used in optical communication is not possible without dramatic reformulation of the photosensitive media, because they do not match the photosensitivities of the media.

SUMMARY OF THE INVENTION

These problems encountered for color laser printing must be solved by developing a new fiber wavelength division multiplexer to perform the function of beam combination.

The present invention is developed to solve the aforementioned problems in the prior art. The objective is to provide a compact, easy to align, flexible optical printhead for color laser printing. In color laser printing, three or more lasers with wavelengths corresponding to the media photosensitivities are required for full color reproduction. The use of fiber optics and a flexible beam-combining device enhances the flexibility in the placement of components associated with a color laser printing apparatus. Certain aspects of the system can be made more compact with greater ease in alignment while increasing the ability to control adverse effects of heat generation by certain components such as the lasers.

The present invention further provides a color printer using color laser light sources that are combined using an optical fiber multiplexer, said printer comprising a first laser source having a first wavelength, a second laser source having a second wavelength. An optical fiber multiplexer having at least two input ports for combining at least said first and second laser beams into at least one output port, containing light beams from said first and second laser beams.

Other features and advantages will become apparent upon reference to the following description of the preferred embodiment when read in light of the attached drawings.

DETAILED DESCRIPTION OF THE PREFERRED EMBODIMENT

Figure 1:
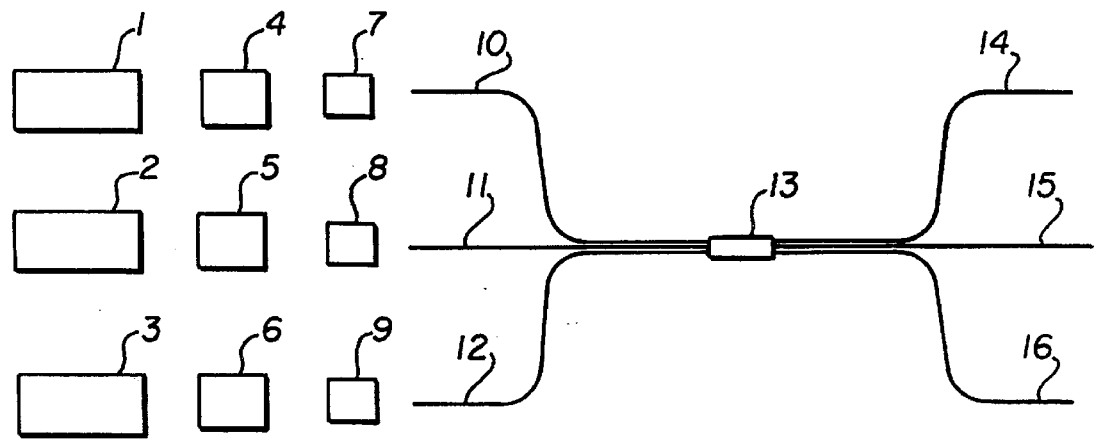
FIG. 1 illustrates a preferred embodiment of the optical fiber multiplexer for use in color laser printing according to the present invention.

FIGS. 1 shows a preferred embodiment of a beam-combining device for use in color laser printing. There are provided three laser light sources 1, 2, 3, each of a different wavelength corresponding to the media photosensitivities. These laser sources are modulated individually through modulators 4, 5, 6 according to the image or text information to be printed. The modulators can be, for example, an electronic modulation circuit to modulate the laser sources themselves or an acousto-optic modulator and may require additional optical elements (not shown) to focus the laser light sources down to the modulators. Modulated laser beams are then coupled into the input ports 10, 11, 12 of the optical fiber multiplexer 13 through focusing means 7, 8, 9. Each input port is comprised of an optical fiber of the same core diameter to ensure symmetrical operation for all the laser sources used. The optical fiber multiplexer 13 can be constructed, for example, by using a fused biconical taper process. Here, the three fibers are placed in contact with one another and heated until they coalesce into a composite waveguiding structure. Additionally, while the fibers are heated, they are slowly stretched and tapered. In-situ monitoring of transmission ratio for the wavelengths of interest are performed and the heating and stretching actions are stopped when correct transmission ratio is achieved, taking into account the difference in stretch length introduced in the natural cooling process.

For further information on the method of making such optical fiber multipexers, the following patents would be of interest: U.S. Pat. No. 4,772,085, entitled "MULTIMODE FIBER OPTIC COUPLER AND METHOD OF MAKING", issued in the name of Moore et al on Sep. 20, 1988; Reissue U.S. Pat. No. RE 33,296, entitled "METHOD OF MAKING A POLARIZATION-INSENSITIVE EVANESCENT-WAVE, FUSED COUPLER WITH MINIMAL ENVIRONMENTAL SENSITIVITY", issued in the name of Stowe et al, reissued on Aug. 14, 1990; U.S. Pat. No. 4,798,438, entitled "METHOD OF MAKING A SINGLE-MODE EVANESCENT-WAVE COUPLER HAVING REDUCED WAVELENGTH DEPENDENCE" issued in the name of Moore et al on Jan. 17, 1989; U.S. Pat. No. 4,232,385, entitled "FREQUENCY DIVISION MULTIPLEXING SYSTEM FOR OPTICAL TRANSMISSION OF BROADBAND SIGNALS", issued in the name of Hara et al on Nov. 4, 1980; and U.S. Pat. No. 5,113,244, entitled "FIBER OPTIC COMBINER/SPLITTER", issued in the name of Curran on May 12, 1992.

The beam combining ratio (of beam transmission factors for light beams from different laser sources) here is controlled through the stretch length according to a predetermined ratio to optimize the printing efficiency. All the output ports 14, 15, 16 of the optical fiber multiplexer 13 contain light beams from laser sources 1, 2, 3, resulting in beam combination. Any of the output ports can provide light for the subsequent scanning and imaging optics associated with the color printing apparatus.

Figure 2:
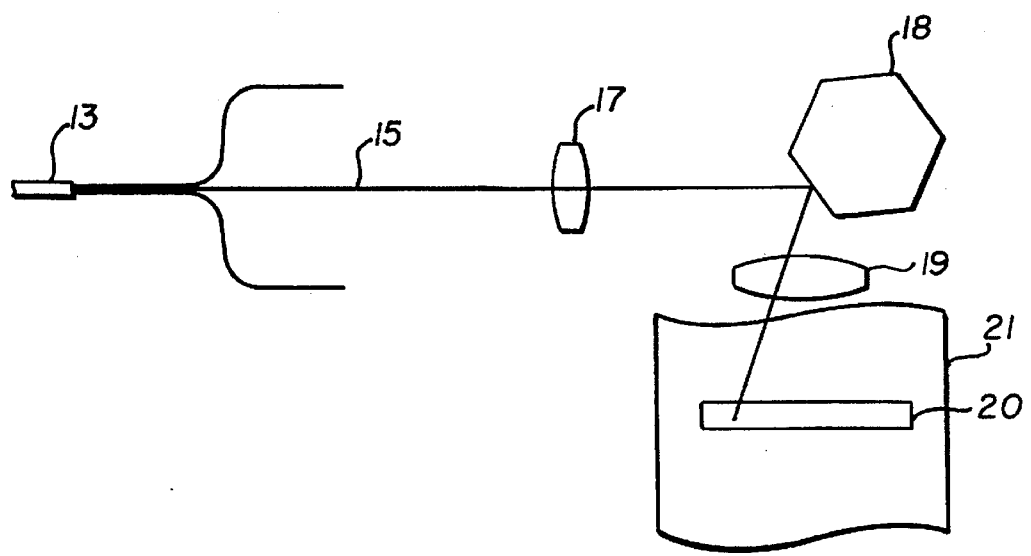
FIG. 2 illustrates the use of optical fiber multiplexer with scanning and imaging optics connected to a single output port to perform color laser printing.

In FIG. 2, the output port 15 provides the laser source for the scanning optics 17, 18. It is, in turn, imaged through imaging optics 19 and 20, onto the photosensitive media 21 to achieve laser color printing. Thus, it can be seen that although three laser sources are used to achieve color laser printing, the use of optical fiber multiplexers make it appear as if only a single light source is being used. Laser beams coming out of optical fiber multiplexer 13, for example, output port 15 are co-linear and have good beam quality. The use of optical fiber multiplexer 13 also allows for the flexibility of positioning the laser sources away from both the scanning optics and imaging optics. An optical fiber multiplexer is also known as a fiber beam combiner. From the system design point of view, this allows for greater flexibility utilizing the space available and provides better thermal isolation because the laser sources usually are the source of any heat generation. Another advantage that results from the use of optical fiber multiplexer is that input light sources are essentially isolated from the scanning and imaging optics. In the event that light sources need to be replaced, only light sources and input port associated therewith are required to be realigned, whereas if dichroic mirrors are used as described in the prior art, the whole optical path would require realignment. This reduces both the production cost and replacement cost.

Figure 3:
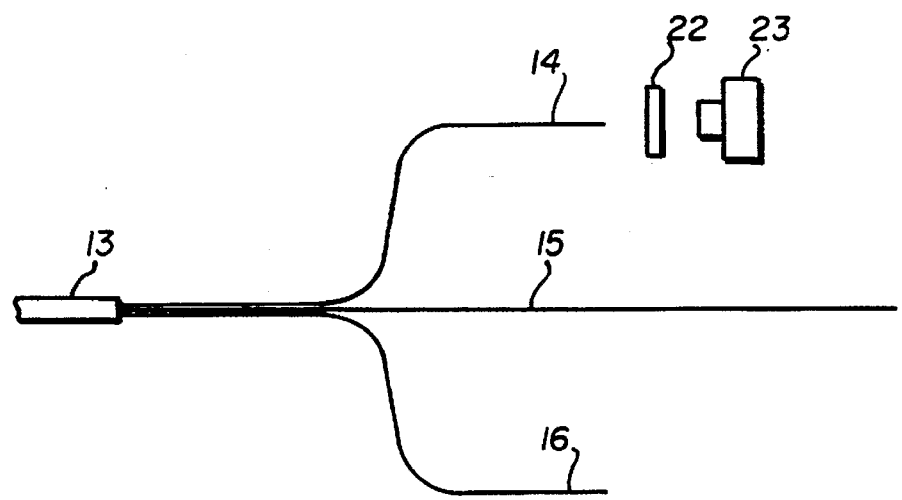
FIG. 3 illustrates the use of one output port of the optical fiber multiplexer together with a filter wheel and a detector to perform power monitoring of the color laser printer.

FIG. 3 shows that either of the remaining output ports 14 or 16 from optical fiber multiplexer 13 can be used as laser power monitoring means with the addition of a filter wheel 22 for the specific wavelengths desired and a detector 23 which are shown in FIG. 2 in conjunction with output port 14. This figure illustrates yet another advantage of this type of beam combining method in a color laser printer, namely, it provides a built-in power monitoring port, such as in output port 16, without any additional beam splitter required to tap off optical power for monitoring purpose and the system is thus simplified. Power monitoring is generally necessary because it is important to keep the output power levels of each laser beam at a predetermined value to maintain the color calibration of the printer. The signal detected through detector 23 can be fed back to the laser sources to maintain the required light levels at the output port.

To prevent reflection of light back into the light sources which disturbs its operation and manifests itself as light intensity noises, the input ports of the optical fiber multiplexer are either anti-reflection (AR) coated or angle polished. This will ensure that the optical fiber multiplexer does not introduce reflection-induced noises into the color printing system.

It should be understood that the fiber used here can be either single mode fiber or multimode fiber so long as the optical etendue of the fiber used (product of area of optical beam propagating in the fiber and the solid angle of light beam after exiting fiber) does not exceed what the following scanning optics and imaging optics can accept. Some multimode fiber with a large core diameter, relating to the area of optical beam propagating in fiber, and large numerical aperture (NA), relating to the solid angle of light beam after exiting fiber, defined as:

$$NA = \sin\theta = \sqrt{n_1^2 - n_2^2}$$

wherein $n_1$=refractive index of the core; and
$n_2$=refractive index of the cladding;

can have optical etendue larger than can be accepted by the following scanning and imaging optics and efficient use of optical power will then be compromised.

Figure 4:
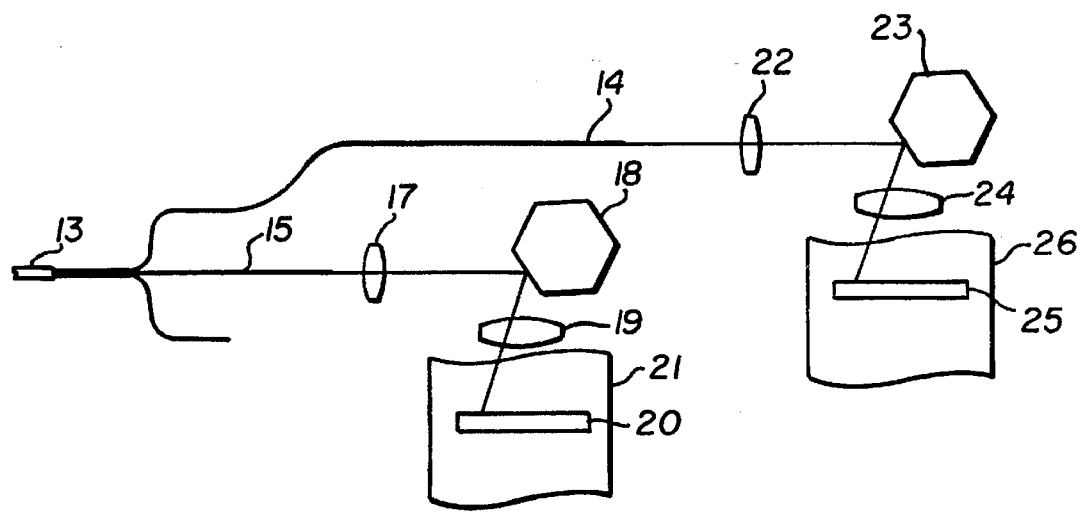
FIG. 4 illustrates the use of optical fiber multiplexer to produce two sets of prints of the same, image.

In a further embodiment shown in FIG. 4, the two output ports 14, 15 of the optical fiber multiplexer 13 are used simultaneously for printing, producing two prints of the same image, one on each printing apparatus.

Figure 5:
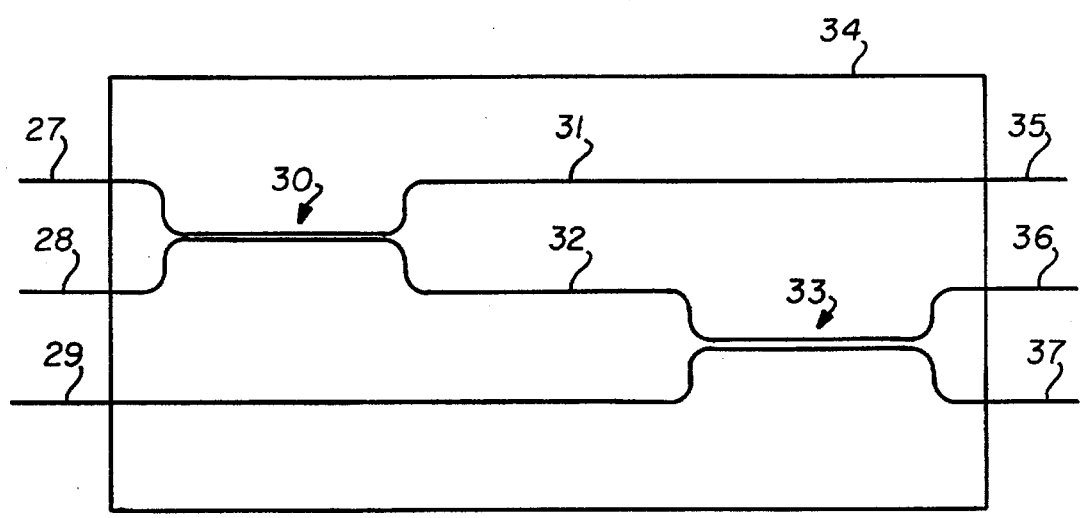
FIG. 5 illustrates another embodiment of the optical fiber multiplexer to obtain higher combining ratio in one of the wavelengths at one of the output ports of the optical fiber multiplexer.

To accommodate for the different ratios of beam combination according to the media sensitivity and the output power available from the light source, different beam combining ratios can be chosen when all the input fibers are fused together. In specific cases that require higher intensity in one wavelength due to low photosensitivity of media to that light source, an alternative embodiment of the optical fiber multiplexer can be implemented as shown in FIG. 5 by using, for example, the same fused biconical taper process to first fuse two input ports 27,28 are used as an input to optical fiber multiplexer 30. This is followed by fusing a third input port 29 with one of the two output ports 31,32 of optical fiber multiplexer 30; in this instance, output port 32 was used. In this specific example, output port 32 and input port 29 form an optical fiber multiplexer 33. The two optical fiber multiplexers form a fiber combination 34 in this embodiment. Light coming from input port 29 can have higher transmission factor than those from either of the other two input ports 27,28 because it only goes through one optical fiber multiplexer 33 as compared to those from input ports 27,28 which go through two optical fiber multiplexers, 30 and 33. In each optical fiber multiplexer, part of the light will be coupled out to the other fiber, the more optical fiber multiplexers it passes through, the more light will be coupled out and the greater the loss incurred by the optical fiber multiplexer.

Polarization preserving fibers can be used with any of the embodiments to form the optical fiber multiplexer. This is needed because the performance of some of the optical components, such as polygons, depends on the polarization states of the incoming light and these optical components are generally used in the subsequent imaging and scanning optics. The change of polarization states associated with a light beam coming out of optical fiber multiplexer, when used in conjunction with the polarization dependent optical elements, manifests itself in the form of noise which may not be tolerable and thus is highly undesirable in a color laser printing apparatus.

This invention has been described in detail with particular reference to the preferred embodiment thereof, but it will be understood that variations and modifications can be effected within the spirit and scope of the invention.

We claim:

1. In a color printer using color laser beams that are combined using optical fiber multiplexers to combine the laser beams in different ratios, said printer comprising:

first, second and third laser light sources, each having a different wavelength;

a first optical fiber multiplexer having first and second input ports connected to said first and second laser light sources and further including a pair of output ports each having both first and second wavelengths of light; and a second optical fiber multiplexer having a first input port connected to said second output of said first optical fiber multiplexer and its second input port connected to said third laser light source and a pair of output ports having first, second and third wavelengths of light.

2. The color printer as set forth in claim, 1 wherein a modulation means is associated with each laser light source.

3. The color printer as set forth in claim 1 wherein a focusing means is associated with each laser light source.

4. The color printer as set forth in claim 1 wherein the optical fiber used to form the optical fiber multiplexers are of different core diameters to permit increased beam combining efficiency.

5. The color printer as set forth in claim 1 wherein the optical fiber used to form the optical fiber multiplexer takes the form of a polarization preserving fiber.

6. The color printer as set forth in claim 1 wherein said input and output ports are anti-reflection coated.

7. A color printer using more than one laser source, each of different wavelengths, said printer comprising:

modulating each of said laser light sources independently;

focusing each of said laser light sources independently; and combining said laser light sources using an optical fiber multiplexer having multiple input ports receiving all modulated focused laser light sources and at least one output port containing light beam wavelengths of all the inputted laser light sources.

8. The color printer as set forth in claim 7 wherein one output port is used for imaging optics.

9. The color printer as set forth in claim 7 wherein one output port is used to control line start in printing.

10. The color printer as set forth in claim 7 wherein one output port is used to control laser beam power.

11. The color printer as set forth in claim 7 wherein said ports are angle polished to prevent light reflection.

12. The color printer as set forth in claim 7 wherein the optical fiber takes the form of a polarization preserving fiber.

13. The color printer as set forth in claim 7 wherein the optical fibers used to form the optical fiber multiplexer are of different core diameters to permit increased beam-combining efficiency.

14. The color printer as set forth in claim 7 wherein said input and output ports are anti-reflection coated.

15. In a color printer using color laser beams that are combined using optical fiber multiplexers in different ratio, said printer comprising:

first and second laser light sources, producing first and second wavelengths of light, respectively;

a first optical fiber multiplexer having first and second input ports connected to said first and second laser light sources and further including a pair of output ports each carrying both said first and second wavelengths of light; and a second optical fiber multiplexer having a first input port connected to said second output of said first optical fiber multiplexer and its second input port connected to one of said laser light sources, and a pair of output ports having said first and second wavelengths of light.

16. The color printer as set forth in claim 15 wherein said ports are angle polished to prevent light reflection..

17. The color printer as set forth in claim 15 wherein the optical fiber takes the form of a polarization preserving fiber.

18. The color printer as set forth in claim 15 wherein the optical fibers used to form the optical fiber multiplexer are of different core diameters to permit increased beam-combining efficiency.

19. The color printer as set forth in claim 15 wherein said input and output ports are anti-reflection coated.

\* \* \* \* \*